June 10, 1969 D. T. DUNLAP Re. 26,604

CIGARETTE FILTER PLUG AND PROCESS AND APPARATUS FOR MAKING SAME

Original Filed Sept. 30, 1958

United States Patent Office

Re. 26,604
Reissued June 10, 1969

26,604

CIGARETTE FILTER PLUG AND PROCESS AND APPARATUS FOR MAKING SAME

Donald T. Dunlap, Charlotte, N.C., assignor to Celanese Corporation, a corporation of Delaware Original No. 3,190,294, dated June 22, 1965, Ser. No. 764,338, Sept. 30, 1958. Application for reissue June 20, 1967, Ser. No. 653,588
Int. Cl. A27f *7/04, 13/06;* B01d *27/00*
U.S. Cl. 131—267 10 Claims

Matter enclosed in heavy brackets [ ] appears in the original patent but forms no part of this reissue specification; matter printed in italics indicates the additions made by reissue.

The present invention relates to a novel, shape-retaining fibrous material and to a process and apparatus whereby it can be formed. More particularly, it relates to the formation of a shape-retaining structure of thermoplastic filimentary material suitable for use as a cigarette filter plug.

Cellulose acetate has gained wide acceptance as a filter for tobacco smoke, being incorporated as a mouthpiece on cigarettes. In one procedure for manufacturing such cigarettes, a tow or bundle of several thousand continuous cellulose acetate filaments is spread flat, sprayed with a plasticizer, brought into a predetermined shape by passage through a corresponding shaped aperture in a device referred to as a condenser, and fed into a conventional cigarette wrapping machine together with cigarette paper. The paper wraps the tow into a continuous rod and is then secured to maintain the shape in the same manner that tobacco is held in paper to form cigarettes. After the paper-wrapped filter rod is cut into plugs of the desired length, the plugs are cured to effect stiffening of the filter through bonding of the filaments at their points of contact and the plugs are incorporated into cigarettes in well-known manner by being wrapped in cigarette paper with tobacco.

By proceeding as outlined, time is consumed in the initial wrapping of the tow in paper, and where the paper is secured by glueing, in the application of glue to seal the paper and in the drying of the glue. In addition, paper and glue are required which, though not contributing to filtration, add to the cost of the filter.

In another procedure, a bundle of filaments is heated while being passed through a stationary shaping member. The heat is applied in such amount that the surface filaments are fused to form an impervious sheath. While the sheath serves to retain the shape without a paper wrapping, the filaments employed in forming the sheath lose their filamentary character and will not contribute to filtration of smoke. The resulting overall filtration efficiency will thus be lower than for paper wrapped filters wherein all filaments are effective during filtration.

Accordingly, the primary object of the present invention is the provision of a novel process and apparatus for the rapid production of paperless shape-retaining cigarette filter rods and plugs without loss of the filamentary character of the component filaments.

Other and further object of the invention will be apparent from the description which follows.

In accordance with the present invention, a continuous tow of limp thermoplastic filaments is spread flat and sprayed with a plasticizer, i.e. partial solvent or swelling agent which is preferably non-volatile or an active solvent which is preferably volatile. The plasticized tow is then passed through heated grooved movable members such as rollers or wheels which condense the tow into a predetermined transverse shape such as a circle, ellipse, etc., and heat the surface of the tow sufficiently to cohere the outermost filaments to each other at their points of contact without destroying their filamentary character. The heat may be supplied by a quartz tubular heating element or by equivalent heating means.

Although there is movement of the heated grooved rollers or wheels, the surface of the tow is stationary with respect to those portions of the heated surfaces which shape the same and cohere the surface filaments thereof. Non-circular clamping members movable with the tow upon clamping engagement therewith, such as links on an endless chain or belt, may also be used to serve the same purpose through circular elements are preferred since these lead to continuity of operation and more rapid production rates. As will now be evident, there is no wiping action of the shaping member relative to the filaments and filter elements of high overall filtration efficiency are rapidly and simply obtained.

Upon cooling the cohered filaments cause the structure to retain the shape it had during heating. The filter rod is then cut into plugs for incorporation into cigarettes.

It is essential in accordance with the invention that the filamentary tow be treated with plasticizer to permit bonding of the superficial filaments initially under such mild conditions that they will not lose their filamentary character as in formation of a skin. The plasticizer also permits curing to be effected without heating so intensely as disadvantageously to alter the physical character of either the inner or outer filaments.

The invention will now be described more fully with reference to the accompanying drawing wherein.

Figure 1:
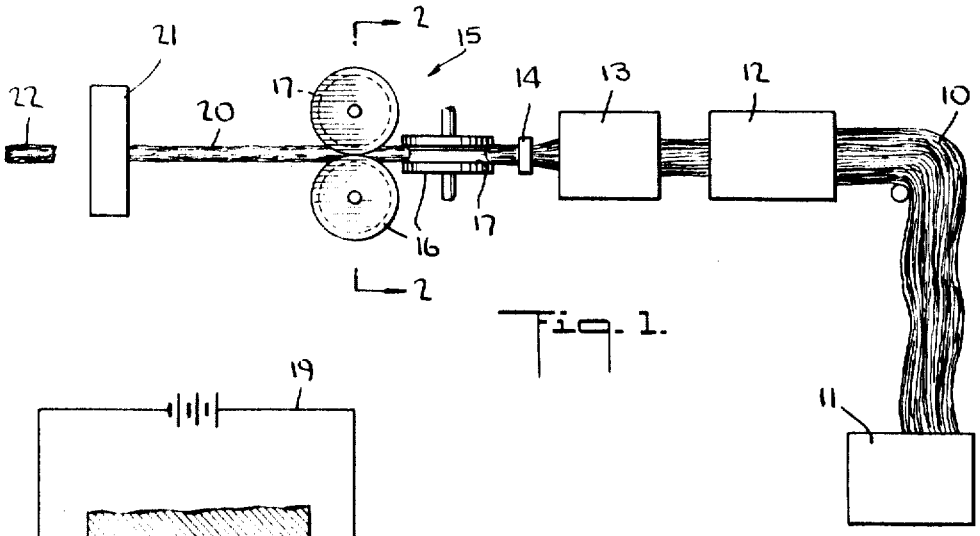
FIG. 1 is a schematic elevation of an apparatus for making cigarette plugs and illustrating the procedure of the present invention.
Figure 2:
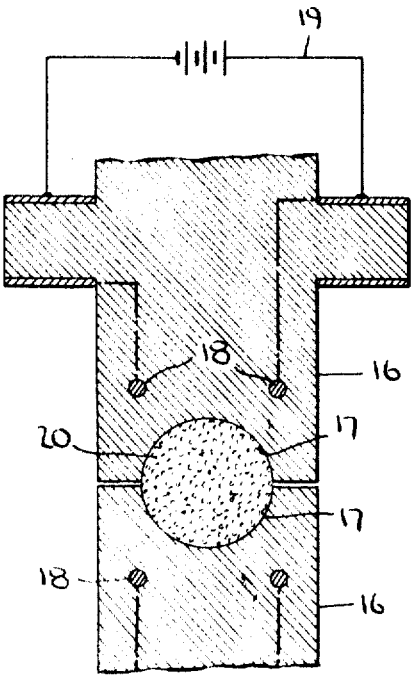
FIG. 2 is a section taken through the forming and heating rolls along the line 2—2 in FIG. 1.

Referring now more particularly to the drawing, in FIG. 1 there is shown a crimped cellulose acetate tow 10 composed, for example, of 9000 continuous filaments of 8 denier. The tow 10 is removed from its shipping container 11 and is opened or spread flat by opener 12 of conventional construction. The tow 10 then passes continuously through box 13 into which plasticizer is sprayed as a mist, the opened tow picking up the plasticizer. The plasticized tow next advances through a circular guide or condenser 14 toward the heated elements. 15.

As can be seen the heating elements 15 are constituted, in the preferred form of the invention which is illustrated, by numerous pairs of small grooved rollers or wheels 16, the groove being a peripheral groove 17. In the drawing, two pairs of wheels are placed so that their rotational planes are offset at an angle, one in horizontal and the other in vertical position. As will be evident, these angles may be varied and more than two pairs of rollers or wheels may be employed for the purpose of ironing out or eliminating any markings or distortions caused by the forming wheels or rolls. The pairs of rollers or wheels 16 are preferably closely spaced with respect to one another so that the tow is still warm on reaching the second pair of rollers and so that formation of a coherent mass can be effected rapidly without repeated heating which would form an unduly thick skin on the surface and would unite the inner filaments at so many points as to reduce the surface area for filtration and as to form a stiff rigid rod. As will be evident, the rollers or wheels in each of the pairs 16 are opposed to one another so that the filamentary tow is shaped therebetween.

The rollers or wheels 16 may be driven at machine speed, e.g. at a rate such that the peripheral velocity of the wheels, particularly at the bottom of the grooves 17 formed therein, coincides with the linear velocity of the tow. On the other hand, the rollers or wheels 16 may be free rolling in which event the rate of rotation thereof is controlled by the passage of the tow between the pairs of rollers and other means such as a conventional cigarette making machine, which is normally directly in back of the filter forming unit to take the rod and cut it into plugs in the manner that wrapped tobacco is cut into short lengths, or driven unheated feed rollers may be employed to pull the filamentary tow through the heated forming rollers. The grooves in the various pairs of rollers may all be shaped to define a substantially circular opening of somewhat larger diameter with the trailing pairs of rollers being grooved to define a substantially circular opening of somewhat smaller diameter.

In the form of the invention which is illustrated, the forming rollers or wheels 16 include electric heating elements 18 imbedded therein, an electrical circuit 19 being employed whereby the forming rollers 16 are heated to filament cohering temperature.

Instead of or in addition to electrical heating, the various pairs of rollers 16 may be confined within an oven, preferably a radiant heated over, and the rollers heated by the heat of the oven. If desired, additional pairs of rollers may be employed to facilitate cooling of the rod, these additional rollers or wheels having refrigerant passing therethrough to assist in the cooling operation. However, and as is illustrated in the drawing, air cooling of the shape-retaining rod is permissible.

The surfaces of the grooves on all of the rollers or wheels are desirably coated with a release agent, such as a silicone release agent or these surfaces may be plated or sand blasted to reduce the possibility that the filamentary tow will stick to the rollers or wheels.

The tow is now in the form of a paperless shape-retaining cigarette filter rod 20 which passes to the cutter 21 of a conventional cigarette making machine where it is severed into filter plugs 22. These plugs 22 can be incorporated into cigarettes in the same manner heretofore employed with paper-wrapped plugs, after a cure to stiffen the inner filaments by bonding them to each other.

Figure 4:
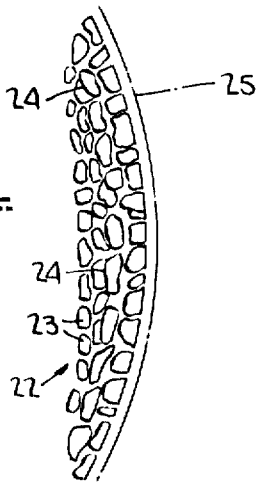
FIG. 4 is a transverse section on a greatly enlarged scale through a portion of the plug shown in FIG. 3.
Figure 3:
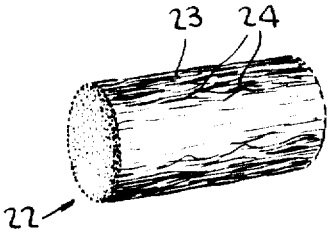
FIG. 3 is a perspective view of a plug produced by the apparatus of FIG. 1.

As shown on an enlarged scale in FIG. 3, the plugs 22 is composed of a plurality of crimped wavy filaments 23 extending longitudinally. Because of the crimps the filaments contact wtih each other at a plurality of locations such as at 24 and they are cohered without loss of their filamentary character so that all filaments contribute to the filtering action. As can be seen in FIG. 4, the outer surface portions of the outermost filaments are seen to be slightly filattened so as to be substantially coincident with the continuous closed curve defining the periphery of the filter, i.e., curve 25 shown in broken lines and slightly offset for ease of illustration.

The tow can be formed of any thermoplastic filamentary material such as nylon, linear polyesters such as polyethylene terephalate, and the like, but the preferred materials are cellulose esters of organic acids and particularly cellulose acetate, the acetyl value of which can range from about 50 to about 62.5% by weight calculated as acetic acid.

The sprayed plasticizer softens the surfaces of the filaments and permits cohesive joinder of the outermost filaments under thermal conditions which will not destroy the filamentary character of the filaments. The composition of the plasticizer will depend up the composition of the tow. With cellulose acetate the preferred plasticizers include swelling agents such as glycreol triacetate, triethyl citrate, dimethoxy-ethyl phthalate, methyl phthalyl ethyl glycolate, and the like, and active solvents such as acetone, methylene chloride, dioxane, dimethyl formamide, and the like. The plasticizer can be applied in an amount ranging from about 3 to 30% by weight of the tow. When the plasticizer comprises a low boiling solvent preferably only moderate temperatures are utilized to effect bonding, thereby preventing condensation pick-up due to rapid cooling caused by rapid evaporation of solvent at high temperatures. Where the plasticizer comprises a swelling agent the temperature of heating can range from about 350 to 600° F. and preferably 400 to 500° F. and the duration of heating totals from about one to about ten seconds. As will be evident, the duration of heating supplied to the tow by any given pair of rollers 16 is only a fraction of a second but the tow remains within the desired temperature range for the indicated time interval because of the close positioning of the successive rollers.

In making a filter for a cigarette of conventional size, the tow can range in denier from about 60,000 to 120,000 and the individual filaments thereof can range from about 3 to 16 denier. The tow employed is preferably a crimped tow having from about 6 to 12 crimps per inch of tow, the length being determined by placing a specimen of the tow under sufficient tension to remove the crimps therefrom.

The following example is given by way of illustrating the practice of the present invention.

EXAMPLE

A tow of 10,000 continuous filaments, 80,000 total denier, of cellulose acetate of an acetyl value of 54–56%, having 8–10 crimps per inch based on the tensioned length of the tow, is opened and spread out to a width of 12 to 14 inches and glycerol triacetate is applied thereto by spraying to the extent of 10% by weight of the tow. The plasticized tow is then passed through the heated rollers 15 as shown in FIG. 1. The surface of the heated rollers which contacts the tow is maintained at a temperature of about 450° F. by means of a tubular quartz infrared lamp and the plasticized tow is advanced at the rate of about 1½ feet per second through 4 pairs of freely rotatable rollers successively offset at 90° angles. Each roller is 2⅛ inches in diameter. After leaving the last pair of rollers, the tow, which is now a shape-retaining rod about 25 mm. in circumference is cut into plugs 90 mm. long which plugs are cured at room temperature in 2 hours.

Using another swelling agent such as the citrate, phthalate or glycolate named hereinabove gives substantially the same results after curing for 1 hour at 175° F.

The product is characterized by a smooth surface free of belt imprint.

It is to be understood that the foregoing detailed description is given merely by way of illustration and that many variations may be made therein without departing from the spirit of my invention.

Having described my invention what I desire to secure by Letters Patent is:

1. A shape-retaining cigarette filter plug comprising a plurality of crimped thermoplastic filaments [of total denier ranging from about 60,000 to 120,000 and of individual denier ranging from about 3 to 16,] all of said filaments because of their crimp contacting other filaments at a plurality of spaced locations, the outermost filaments being plasticized and cohered into a shape-retaining surface without loss of their filamentary character, said plug having a smooth surface.

2. A plug according to claim 1 in which said filaments comprise cellulose acetate.

3. The process of forming shape-retaining paperless cellulose acetate cigarette filter plugs which comprises opening a limp tow of continuous, crimped cellulose acetate filaments, spraying a plasticizer for cellulose acetate onto said opened tow, conveying said plasticized tow between a plurality of pairs of rotatable heated opposed peripherally grooved rollers which cooperate to shape said tow into predetermined configuration and to cohere the outermost filaments of said tow to each other at their points of contact without destroying their filamentary character, said rollers being rotated at a peripheral speed equal to the linear speed of said tow in passing therebetween, the plane in which each pair of rollers rotates being offset relative to the rotational planes of adjacent pairs of rollers, and cooling and severing said cooled tow into plugs of predetermined length to produce a cigarette filter plug of high overall filtration efficiency.

4. The process recited in claim 3 in which about 3 to 30% by weight of said plasticizer is applied to said tow.

5. Apparatus for forming shape-retaining paperless cigarette filter plugs from a continuous tow of limp thermoplastic filaments, comprising means for opening said tow, means for applying plasticizer to said opened tow, a plurality of pairs of heated opposed peripherally grooved rollers for shaping said tow into predetermined configuration whereby the outermost filaments of said tow are caused to cohere to each other at their points of contact without destroying their filamentary character, the plane in which each pair of rollers rotates being offset relative to the rotational plane of adjacent pairs of rollers, means for advancing said tow between said pairs of rollers at a linear speed equal to the peripheral speed of said rollers, and means for severing said tow into plugs of predetermined length to produce a cigarette filter plug of high overall filtration efficiency.

*6. A shape-retaining cigarette filter plug comprising a plurality of crimped thermoplastic filaments of total denier ranging from about 60,000 to 120,000, all of said filaments because of their crimp contacting other filaments at a plurality of spaced locations, the outermost filaments being plasticized and cohered into a shape-retaining surface without loss of their filamentary character, said plug having a smooth surface.*

*7. A shape-retaining cigarette filter plug comprising a plurality of crimped thermoplastic filaments of individual denier ranging from about 3 to 16, all of said filaments because of their crimp contacting other filaments at a plurality of spaced locations, the outermost filaments being plasticized and cohered into a shape-retaining surface without loss of their filamentary character, said plug having a smooth surface.*

*8. A shape-retaining cigarette filter plug comprising a plurality of crimped thermoplastic filaments of total denier ranging up to about 120,000 and of individual denier ranging from about 3 to 16, all of said filaments because of their crimp contacting other filaments at a plurality of spaced locations, the outermost filaments being plasticized and cohered into a shape-retaining surface without loss of their filamentary character, said plug having a smooth surface.*

*9. A shape-retaining cigarette filter plug comprising a plurality of crimped thermoplastic filaments of total denier ranging from about 60,000 to 120,000 and of individual denier ranging up to about 16, all of said filaments because of their crimp contacting other filaments at a plurality of spaced locations, the outermost filaments being plasticized and cohered into a shape-retaining surface without loss of their filamentary character, said plug having a smooth surface.*

*10. A shape-retaining cigarette filter plug comprising a plurality of crimped thermoplastic filaments of total denier ranging from about 60,000 to 120,000 and of individual denier ranging from about 3 to 16, all of said filaments because of their crimp contacting other filaments at a plurality of spaced locations, the outermost filaments being plasticized and cohered into a shape-retaining surface without loss of their filamentary character, said plug having a smooth surface.*

References Cited

The following references, cited by the Examiner, are of record in the patented file of this patent or the original patent.

UNITED STATES PATENTS

| | | | |
|---|---|---|---|
| 2,476,282 | 7/1949 | Castellan | 154—101 |
| 2,688,380 | 9/1954 | Mac Henry | 183—44 |
| 2,794,480 | 6/1957 | Crawford et al. | 154—1.7 |

FOREIGN PATENTS

| | | |
|---|---|---|
| 790,437 | 2/1958 | Great Britain. |
| 163,893 | 7/1955 | Australia. |

MELVIN D. REIN, *Primary Examiner.*

U.S. Cl. X.R.

156—180, 307, 441